(12) United States Patent
Cohen

(10) Patent No.: US 11,051,467 B2
(45) Date of Patent: Jul. 6, 2021

(54) DRIP IRRIGATION EMITTER

(71) Applicant: Amirim Products Development & Patents Ltd., Yuvalim (IL)

(72) Inventor: Amir Cohen, Yuvalim (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 42 days.

(21) Appl. No.: 16/280,550

(22) Filed: Feb. 20, 2019

(65) Prior Publication Data

US 2020/0260663 A1    Aug. 20, 2020

(51) Int. Cl.
*A01G 25/02*    (2006.01)
*A01G 25/00*    (2006.01)

(52) U.S. Cl.
CPC ...... *A01G 25/023* (2013.01); *A01G 2025/006* (2013.01)

(58) Field of Classification Search
CPC ................. A01G 25/023; A01G 2025/006
USPC ................................................. 239/542, 547
See application file for complete search history.

(56) References Cited

U.S. PATENT DOCUMENTS

| 6,027,048 | A | 2/2000 | Mehoudar |
| 6,250,571 | B1 | 6/2001 | Cohen |
| 2009/0173811 | A1 | 7/2009 | Gorney et al. |
| 2009/0212135 | A1 | 8/2009 | Keren |
| 2011/0186652 | A1* | 8/2011 | Cohen ............... A01G 25/023 239/542 |
| 2012/0199673 | A1 | 8/2012 | Cohen |
| 2012/0267454 | A1* | 10/2012 | Einav ............... A01G 25/023 239/542 |

FOREIGN PATENT DOCUMENTS

WO    WO 2020/170026    8/2020

OTHER PUBLICATIONS

International Search Report and the Written Opinion dated Mar. 26, 2020 From the International Searching Authority Re. Application No. PCT/IB2019/061359. (12 Pages).

* cited by examiner

*Primary Examiner* — Steven J Ganey

(57) ABSTRACT

A drip emitter sized for insertion into a liquid supply tube and positioned adjacent to a dripping aperture in the tube comprises an emitter body having a convex side configured to internally and adjacently fit the tube and an opposite flat side comprising a regulator, wherein the convex side comprises an outlet chamber configured to be fluidically connected to the dripping aperture; a membrane covering at least the regulator; a cover provided with a liquid intake having a filter, wherein the cover is configured to envelop the emitter body except of most of said convex side; and a locking mechanism connecting the flat side and an inner surface of the cover that is adjacent to the flat side so as to join the cover to the emitter body, wherein the membrane is retained therebetween.

15 Claims, 12 Drawing Sheets

FIG. 12B1

DRIP IRRIGATION EMITTER

TECHNICAL FIELD

The present disclosed subject matter relates to drip emitters. More particularly, the present disclosed subject matter relates to structure of regulated drip emitters.

BACKGROUND

Drip irrigation emitters are known in the art and have been welded inside irrigation tubes for several decades. Drip emitters can include an inlet through which liquid flowing in a liquid supply tube can enter the emitter and an outlet through which liquid that entered the emitter can exit to the environment.

Drip emitters can also include flow restricting path that functions to control the rate at which liquid is discharged by the emitter. Via the flow restricting path, liquid that enters the emitter must flow to reach the emitter outlet. The flow restricting path is a high resistance flow channel along which pressure of liquid flowing via the emitter drops fairly rapid with distance along the path.

Some component may be used in an emitter as part of pressure regulation to control the degree of liquid flowing out of the emitter, so that it is independent of the pressure in the tube for a range of pressures required in irrigation applications.

Various types of connections may be used in order to retain together parts of a drip irrigation emitter and in particular parts constituting of body, cover, and a membrane therebetween. In addition, various considerations may be taken as to how to arrange the liquid cavities of the regulated emitter one relative to the other in order to obtain an optimal design for the intended use and performance of the emitter.

The description of the drip irrigation emitter as described in U.S. Pat. No. 5,634,594 by Amir Cohen is herein incorporated by reference in its entirety into the specification, to the same extent as if it was specifically and individually indicated to be incorporated herein by reference.

One of the main challenges of the industry of regulating emitters is to form a stable connection between the cover and the body, especially for the stage in which the emitters are being stored or being directed in a certain direction into the tube. During those stages, the emitters should uphold various forces that tend to disassemble the emitters or harm it.

SUMMARY OF THE INVENTION

It is an object of the disclosed subject matter to address the strength of an emitter especially in the stages in which the emitters are stored as well as the stage in which the emitters are forced in a certain direction to inside the irrigation tube, and its ability to withstand the forces that are subjected on it.

According to a first aspect of the present disclosed subject matter, a drip emitter is sized for insertion into a liquid supply tube and positioned adjacent to a dripping aperture in the tube, the drip emitter comprising:
an emitter body having a convex side configured to internally and adjacently fit the tube and an opposite flat side comprising a regulator, wherein the convex side comprises an outlet chamber configured to be fluidically or fluidly connected to the dripping aperture;
a membrane covering at least the regulator;
a cover provided with a liquid intake having a filter, wherein the cover is configured to envelop the emitter body except of most of said convex side; and
a locking mechanism connecting said flat side and an inner surface of the cover that is adjacent to the flat side so as to join the cover to the emitter body wherein the membrane is retained therebetween.

In some exemplary embodiments, the emitter body further comprises a primary labyrinth on the convex side.

In some exemplary embodiments, the regulator is a regulating labyrinth.

In some exemplary embodiments, the locking mechanism is an ultrasonic welding surrounding at least the regulating labyrinth.

In some exemplary embodiments, the regulator is a pool with regulating hole and slot.

In some exemplary embodiments, at least a portion of the locking mechanism is outwardly projecting from at least one side of the cover.

In some exemplary embodiments, the locking mechanism comprises at least one socket provided on the flat body or the cover and at least one corresponding stud oppositely provided on the cover or the flat body.

According to another aspect of the present disclosed subject matter, a liquid supply tube is provided having sequencing dripping apertures comprising a plurality of drip emitters as disclosed herein before welded to the tube adjacent to one of the dripping apertures.

According to another aspect of the present disclosed subject matter, in a drip emitter sized for insertion into a liquid supply tube and positioned adjacent to a dripping aperture in the tube, the drip emitter comprises:
an emitter body having a convex side comprising a primary labyrinth and an outlet chamber configured to be fluidically or fluidly connected to the dripping aperture and an opposite flat side comprising a regulating labyrinth, wherein the convex side is configured to internally and adjacently fit the tube;
a membrane covering at least the regulating labyrinth; and
a cover provided with a liquid intake having a filter, wherein the cover is configured to envelop the emitter body except of most of said convex side wherein an edge of the cover internally and adjacently fits the tube, the improvement comprising:
a locking mechanism configured to join the flat side of the body to an inner surface of the cover that is adjacent to the flat side, wherein the membrane is retained therebetween; and
an indicator provided on the cover for indicating a position of the outlet chamber.

In some exemplary embodiments, the locking mechanism comprises at least one stud and at least one corresponding socket that are interlocked through applied pressure, and wherein at least a portion of the locking mechanism acts as the indicator.

In some exemplary embodiments, the locking mechanism comprises:
at least one long stud protruding of said flat side;
at least one stud protruding of said flat side;
at least one socket provided in the cover corresponding to the at least one stud; and
at least one long socket in the cover corresponding to the at least one long stud and wherein a bottom of the long socket is protruding out of the cover.

According to yet another aspect of the present disclosed subject matter, the at least one long socket is the indicator.

According to yet another aspect of the present disclosed subject matter, in a drip emitter sized for insertion into a liquid supply tube and positioned adjacent to a dripping aperture in the tube, the drip emitter comprises:

an emitter body having a convex side comprising an outlet chamber configured to be fluidically connected to the dripping aperture and an opposite flat side comprising a labyrinth and a regulating pool having a hole and a slot, wherein the convex side is configured to internally and adjacently fit the tube;

a membrane covering the regulating pool and at least a part of the labyrinth; and a cover having a liquid intake and a filter, wherein the cover is configured to envelop the emitter body except of said convex side wherein an edge of the cover internally and adjacently fits the tube, the improvement comprising:

a locking mechanism configured to join the flat side of the body to an inner surface of the cover that is adjacent to the flat side, wherein the membrane is retained therebetween.

In some exemplary embodiments, the locking mechanism comprises:

at least one stud protruding of said flat side;

at least one socket in the cover corresponding to the at least one stud for connecting the cover to the emitter body.

In some exemplary embodiments, the hole is fluidically or fluidly connected with the outlet chamber and the slot is perforated into the hole, wherein the regulating pool and the membrane are configured to regulate liquid pressure.

According to yet another aspect of the present disclosed subject matter, the labyrinth is fluidically or fluidly connected to the regulating pool.

According to yet another aspect of the present disclosed subject matter, a drip emitter is sized for insertion into a liquid supply tube and positioned adjacent to a dripping aperture in the tube, the drip emitter comprising:

an emitter body having a convex side provided with a labyrinth and configured to internally and adjacently fit the tube and an opposite flat side comprising a regulating labyrinth, wherein the convex side comprising an outlet chamber configured to be fluidically connected to the dripping aperture;

a membrane covering at least the regulating labyrinth; and a substantially flat cover provided with a liquid intake having a filter; and a projecting rim configured to allow ultrasonic welding between the cover and the emitter body wherein the projecting rim encircles at least the regulating labyrinth, wherein the cover and the emitter body are connected to one another through the ultrasonic welding of the projecting rim while the membrane is retained therebetween, and wherein the projecting rim can be provided on the cover or on the body.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings:

FIG. 12B1 illustrates a section of the cross-section view of the cover of the drip emitter of FIG. 10A, in accordance with some exemplary embodiments of the disclosed subject matter;

DETAILED DESCRIPTION

Figure 1A:
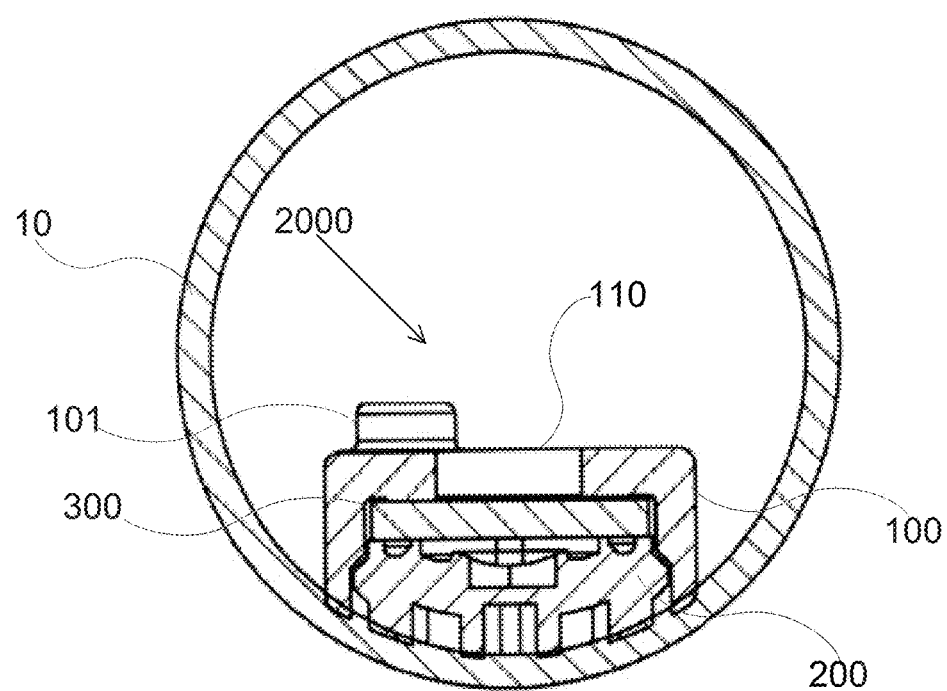
FIG. 1A illustrates a cross-section view of a drip emitter connected inside a liquid supply tube, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Figure 1B:
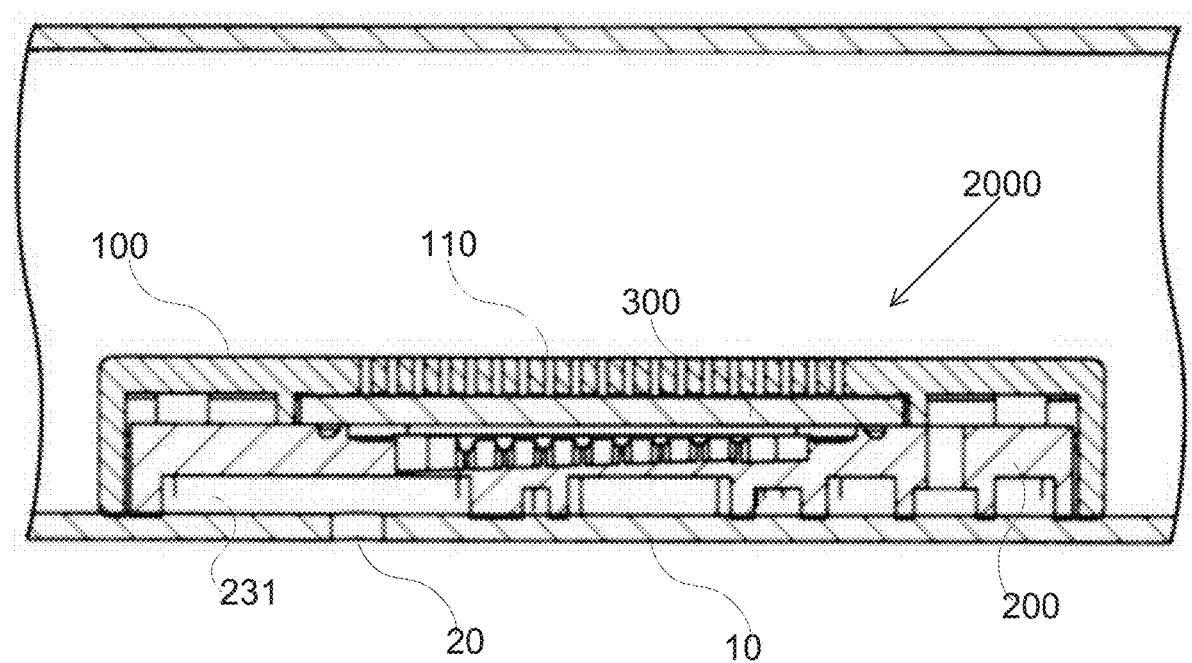
FIG. 1B illustrates a longitudinal cross-section view of the drip emitter of FIG. 1 connected inside a liquid supply tube, in accordance with some exemplary embodiments of the disclosed subject matter.

Referring now to FIGS. 1A and 1B illustrating a cross-section and a longitudinal cross-section views of a drip emitter 2000 connected inside a liquid supply tube 10, in accordance with some exemplary embodiments of the disclosed subject matter. the drip emitter 2000 is sized to fit into the liquid supply tube 10 and positioned adjacent to a dripping aperture 20.

In some exemplary embodiments, the drip emitter 2000 has a convex side adapted (configured) to internally and adjacently fit an inner side of tube 10. The convex side of emitter 2000 can be secured to the inner surface of tube 10 by either welding, glue, ultrasonic soldering, a combination thereof, or the like. It should be noted that emitter 2000 has to be secured to tube 10 in a position that ensures that aperture 20 is situated well within a perimeter projection of outlet chamber 231.

A portion of liquid flowing inside tube 10 can enter the emitter 2000 via a liquid intake, which is an integral part of a cover 100 and is situated along the cover 100. In some exemplary embodiments, the intake can comprise a filter 110 configured to prevent clogging the emitter and or the aperture 20. It should be noted that the emitter 2000 as a whole is fluidically connecting tube 10 and aperture 20 while regulating a flow of the liquid to an environment outside the tube 10. The description of the regulator principles as described in U.S. Pat. No. 5,609,303 by Amir Cohen is herein incorporated by reference in its entirety into the specification, to the same extent as if it was specifically and individually indicated to be incorporated herein by reference.

In some exemplary embodiments, the emitter 2000 can be comprised of an emitter body 200 having a convex surface along its longitude side and an opposite flat surface; a cover 100 configured to envelop all emitter body 200 sides except of most of the convex side (surface); and a membrane 300 retained in-between the cover 100 and the body 200. In some exemplary embodiments, edges of the cover 100 are terminated at the convex side of body 200 are configured (shaped) to internally and adjacently fit the inner side of tube 10 so they can be secured, together with body's convex side to the tube 10. In other words, the structure of the emitter 2000 is designed to seal liquid passage to aperture 20 excluding the fluid connection via the intake.

It should be noted that an emitter can be welded to a liquid tube having a diameter that is slightly different from the diameter of the convex portion of the body of the emitter.

Additionally and alternatively, the cover of the emitter can have an undercut in its edge that slightly protrudes towards the convex side of the emitter body, therefore, the cover envelops the emitter body except of most of the convex side, however, there are cases in which there is no undercut and the cover envelops the emitter body except of the whole convex side. The undercut may be a weak connection in some cases and especially in case the emitter is relatively large.

Emitter 2000 can comprise at least one long socket 101 protruding towards an inner space of tube 10. In some exemplary embodiments, the at least one long socket 101 can be utilized, in a process of installing the emitter 2000, as an indication (coding) that point out a location of outlet chamber 231 for verifying its position with respect to aperture 20. For example, the emitter 2000 should be inserted to the tube 10 when the at least one long socket 101 is on the left, thereby indicating that outlet chamber 231 is in the front end of the emitter.

Referring now to FIGS. 2, 2A, 2B, and 2C illustrating a flat side view of the drip emitter 2000, a longitudinal AA cross-section, a BB cross-section and a CC cross-section views of drip emitter 2000, in accordance with some exemplary embodiments of the disclosed subject matter.

In some exemplary embodiments, the emitter 2000 comprises a locking mechanism configured to connect cover 100 to emitter body 200. The locking mechanism comprises two long studs 201 and two studs 202 that are all protrude of the surface of the flat side of emitter body 200. Additionally, the locking mechanism comprises two protruding (long) sockets 101 and two sockets 102 that are part of cover 100 and are provided on an inner surface of the cover that is adjacent to the surface of the flat side. In some exemplary embodiments, the protruding sockets 101, which protrude of flat side 103 of the cover, and sockets 102 correspond to studs 201 and studs 202, respectively, and configured to be interlocked together, i.e. snapped together, upon applied pressure. It should be noted that the two protruding sockets 101, positioned along a side of cover 100, can serve as indicator pointing out the location of outlet chamber 231, as previously described.

It is important to notice that although in the exemplary embodiments along this document, the sockets are provided on the cover while the studs are on the body, it is possible that the locking mechanism comprise sockets on the body and studs on the cover.

Figure 2:
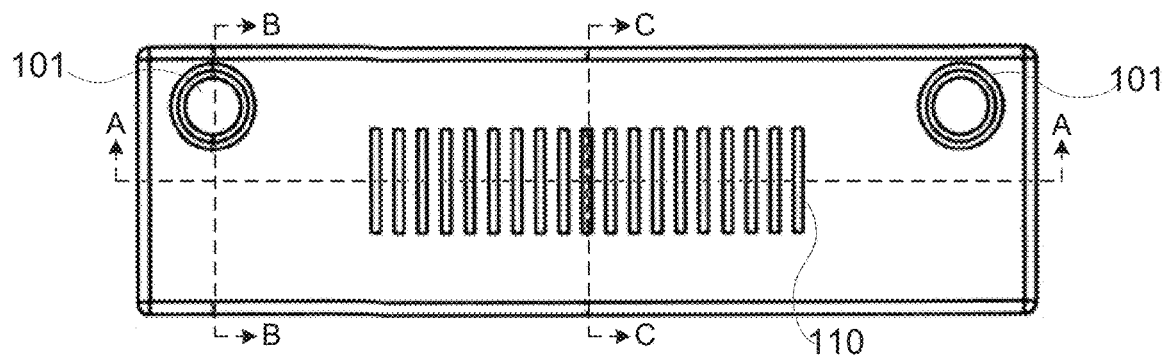
FIG. 2 illustrates a flat side view of the drip emitter of FIG. 1, in accordance with some exemplary embodiments of the disclosed subject matter.
Figure 2A:
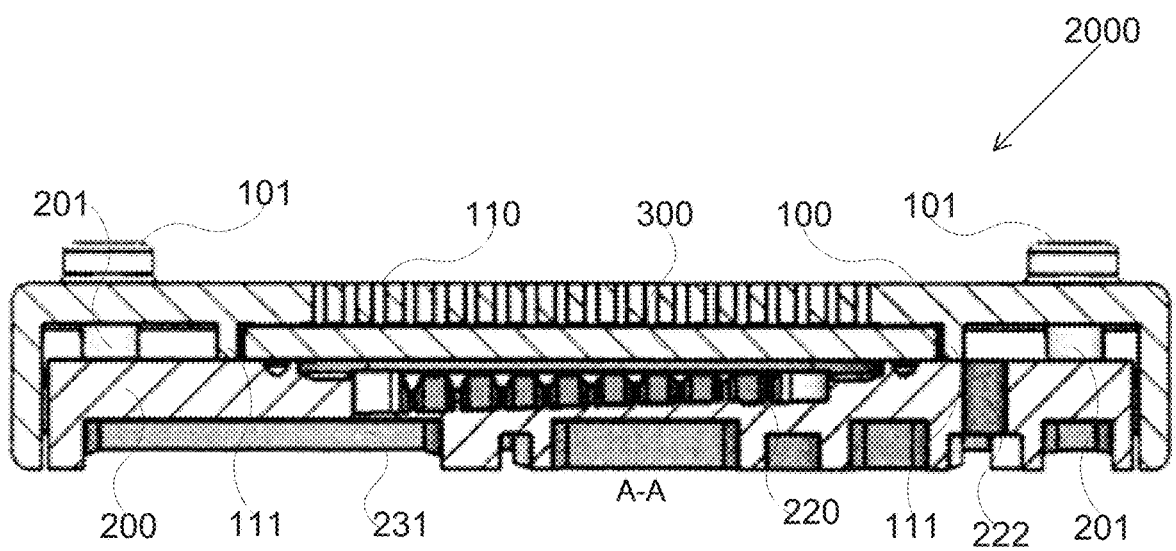
FIG. 2A illustrates a longitudinal cross-section view of the drip emitter of FIG. 1, in accordance with some exemplary embodiments of the disclosed subject matter.
Figure 2B:
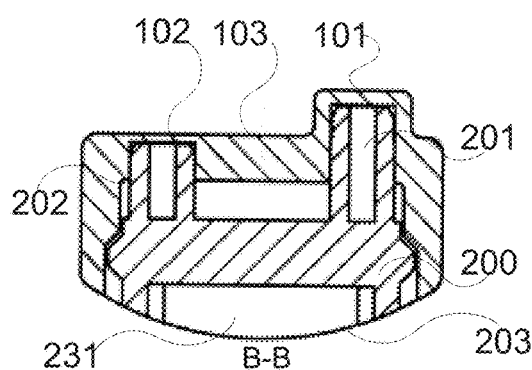
FIG. 2B illustrates a cross-section view of the drip emitter of FIG. 1, in accordance with some exemplary embodiments of the disclosed subject matter.
Figure 2C:
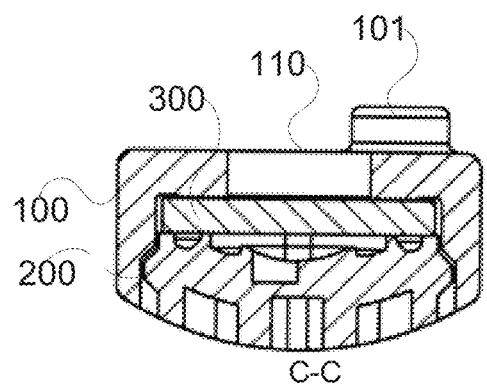
FIG. 2C illustrates another cross-section view of the drip emitter of FIG. 1, in accordance with some exemplary embodiments of the disclosed subject matter.
Figure 3A:
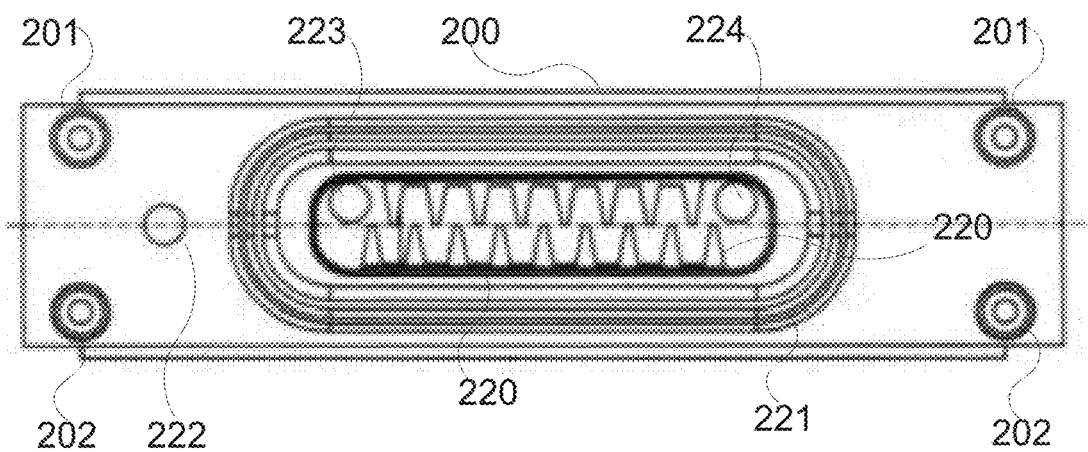
FIG. 3A illustrates a flat side upper view of a body of the drip emitter of FIG. 1, in accordance with some exemplary embodiments of the disclosed subject matter.
Figure 3B:
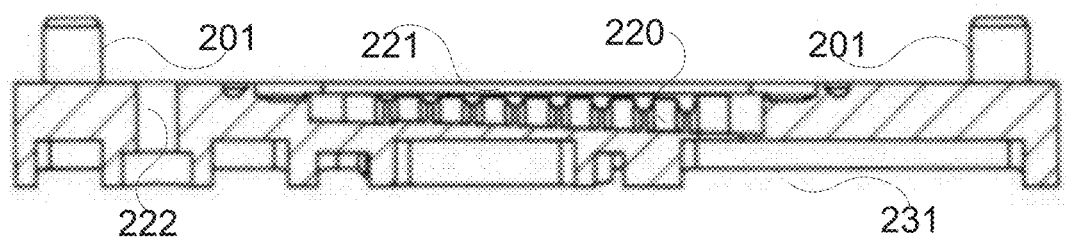
FIG. 3B illustrates a longitudinal cross-section view of the body of the drip emitter of FIG. 1, in accordance with some exemplary embodiments of the disclosed subject matter.
Figure 3C:
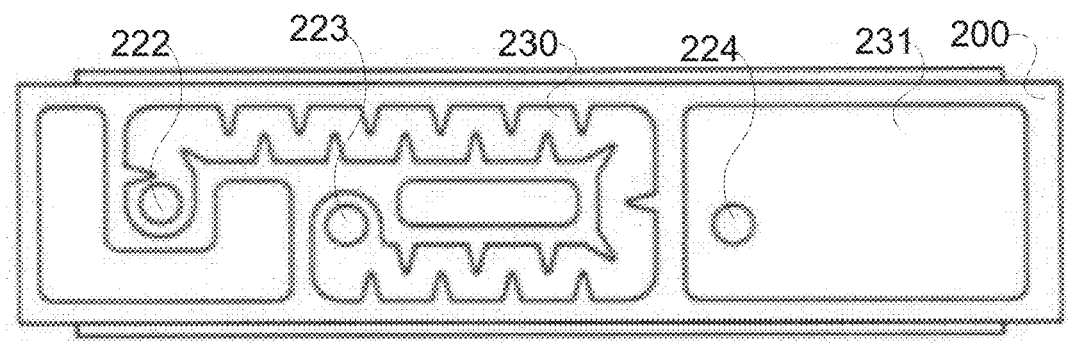
FIG. 3C illustrates a convex side view of the body of the drip emitter of FIG. 1, in accordance with some exemplary embodiments of the disclosed subject matter.
Figure 3D:
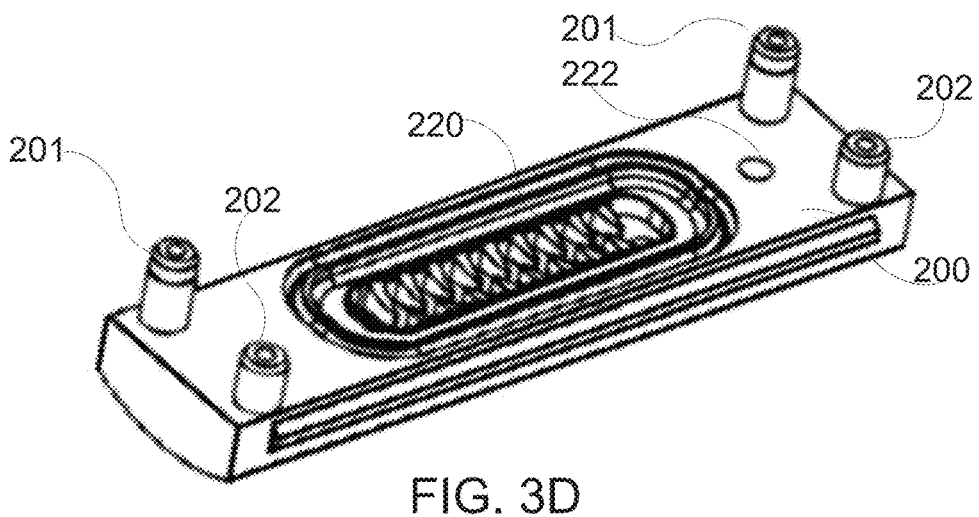
FIG. 3D illustrates an isometric view of the body of the drip emitter of FIG. 1, in accordance with some exemplary embodiments of the disclosed subject matter.

It should be reminded that membrane 300 is confined between cover 100 and body 200, as showed in FIG. 2A. In some exemplary embodiments, membrane 300 substantially covers a regulator 220 while in order to ensure membrane 300 longitude positioning with respect to the regulator, retainers 111 are provided, which are an integral part of cover 100.

In some exemplary embodiments, liquid entering emitter 2000 can flow after passing filter 110 into a primary labyrinth via first passage 222, wherein the primary labyrinth is configured to cause preliminary pressure drop prior to the flow regulation process.

Referring now to FIGS. 3A, 3B, 3C, and 3D illustrating a flat side view; a longitudinal cross-section view; a convex side view, and an isometric view of emitter body 200 of the drip emitter 2000, in accordance with some exemplary embodiments of the disclosed subject matter. Further to the above explanation of the liquid entering primary labyrinth 230 from first passage 222 (clearly seen in FIG. 3C), the liquid further exits the primary labyrinth via second passage 223 into regulator 220 (clearly seen in FIGS. 3A and 3D), and from there proceed to outlet chamber 231 via third passage 224, that is fluidly connected to the dripping aperture 20 (not shown in FIGS. 2-2D).

In some exemplary embodiments, regulator 220 is constitute of a regulating labyrinth covered by membrane 300 (not-shown) positioned within membrane's cavity 221. It should be understood that one side of membrane 300 is subject to pressure applied from the intake side, whereas the opposite side of the membrane 300 is subject to pressure that is building up in the outlet chamber 231 (outlet side), practically dictated by aperture 20 size (resistance).

In some exemplary embodiments, a regulation process is described in the following example, higher pressure in the intake side with respect to the outlet side cause the membrane to cover a large portion of the regulating labyrinth. Thus, forcing the liquid to pass through longer labyrinth path, i.e., high pressure drop by the regulator. In contrast, higher pressure in the outlet side with respect to the intake side cause the membrane to withdraw away from the regulating labyrinth. Thus, allowing liquid to avoid large portion of the labyrinth, i.e. low pressure drop by the regulator.

Figure 4A:
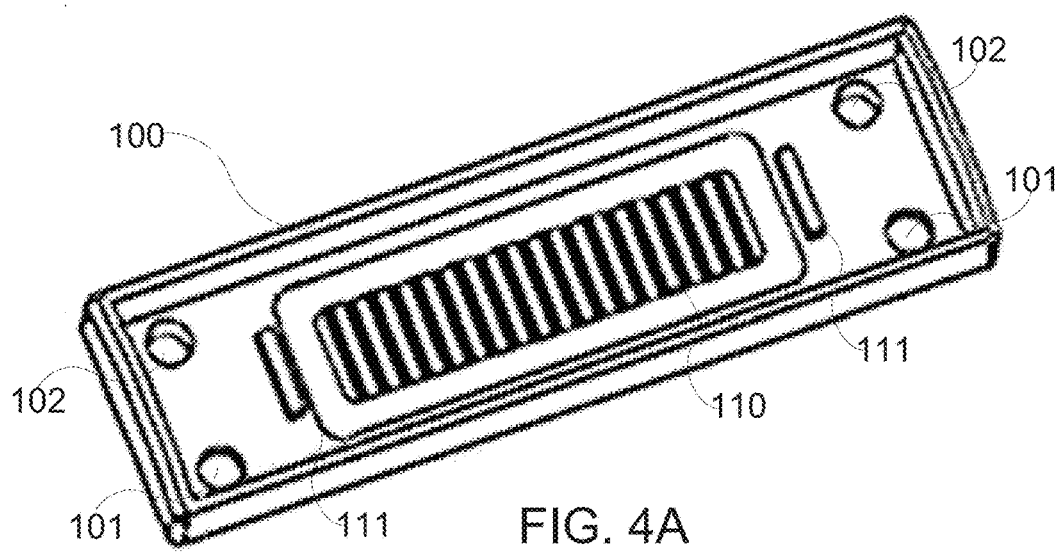
FIG. 4A illustrates an isometric view of an inner side of a cover of the drip emitter of FIG. 1, in accordance with some exemplary embodiments of the disclosed subject matter.
Figure 4B:
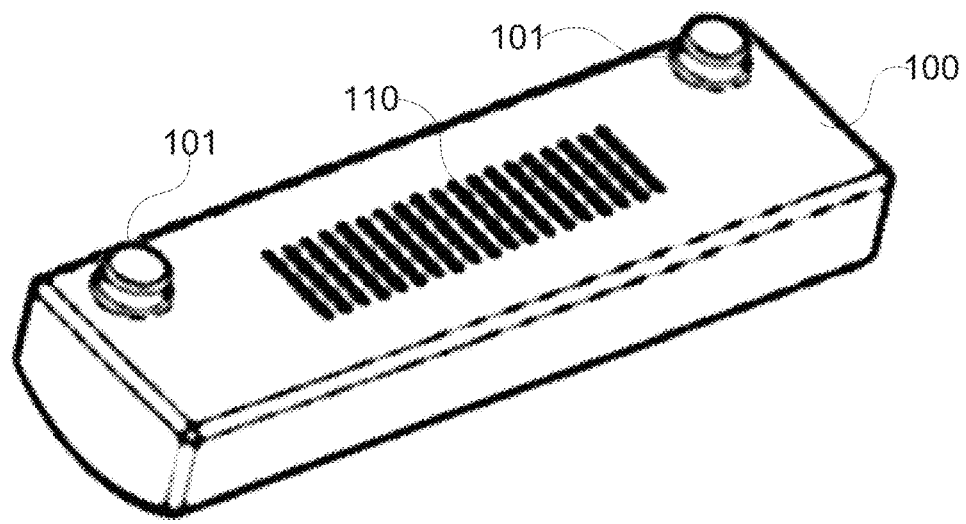
FIG. 4B illustrates an isometric view of an outer side of the cover of the drip emitter of FIG. 1, in accordance with some exemplary embodiments of the disclosed subject matter.

Referring now to FIGS. 4A and 4B illustrating an isometric view of inner and outer sides of a cover 100 of the drip emitter 2000, in accordance with some exemplary embodiments of the disclosed subject matter. The cover 100 is specifically shown to have on its inner surface the protruding sockets 101 and on its inner side all the sockets 101 and 102. As mentioned herein before, the protruding sockets 101 are used as a direction indicator.

Figure 5A:
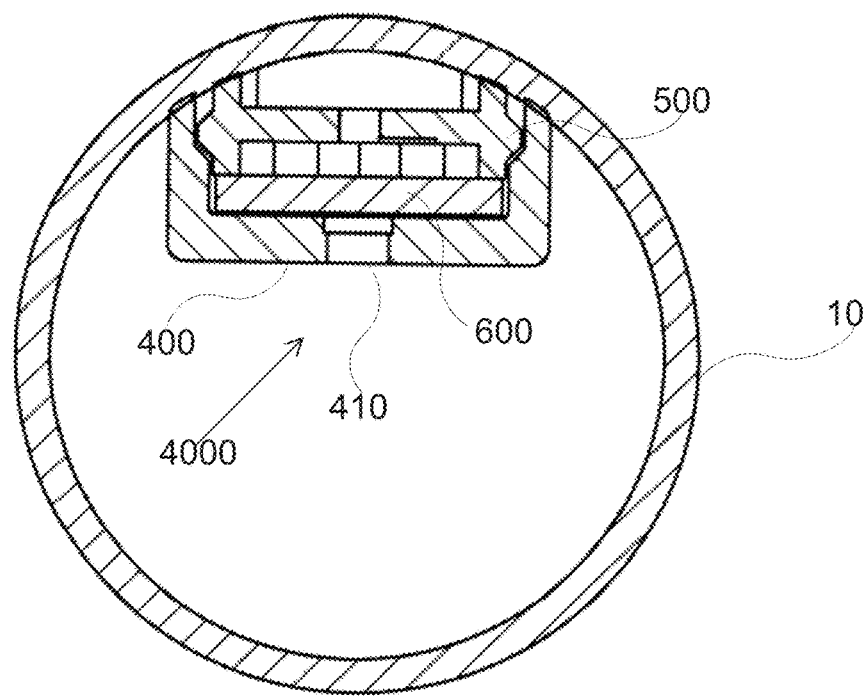
FIG. 5A illustrates a cross-section view of another drip emitter connected inside a liquid supply tube, in accordance with some exemplary embodiments of the disclosed subject matter.
Figure 5B:
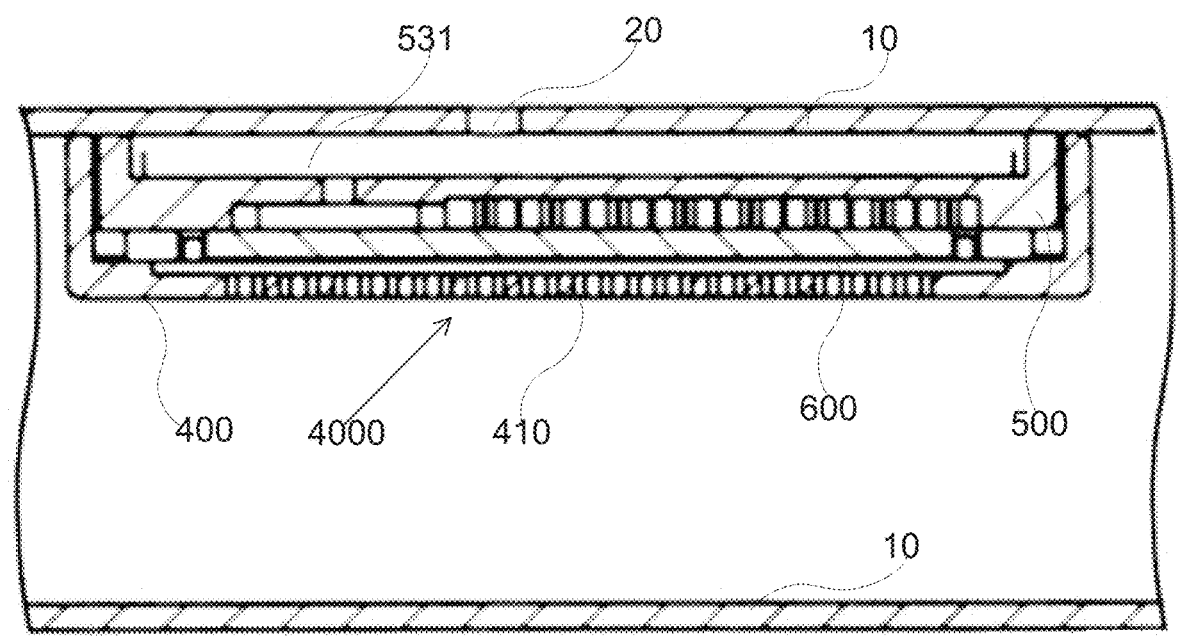
FIG. 5B illustrates a longitudinal cross-section view of the drip emitter of FIG. 5A connected inside a liquid supply tube, in accordance with some exemplary embodiments of the disclosed subject matter.

Referring now to FIGS. 5A and 5B illustrating a cross-section and a longitudinal cross-section views of a drip emitter 4000 connected inside a liquid supply tube 10, in accordance with some exemplary embodiments of the disclosed subject matter. The drip emitter 4000 is sized to fit into the liquid supply tube 10 and positioned adjacent to a dripping aperture 20.

In some exemplary embodiments, the drip emitter 4000 has a convex side adapted (configured) to internally and adjacently fit an inner side of tube 10. The convex side of emitter 4000 can be secured to the inner surface of tube 10 by either welding, glue, ultrasonic soldering, a combination thereof, or the like. It should be noted that emitter 4000 has to be secured to tube 10 in a position that ensures that aperture 20 is situated well within a perimeter projection of outlet chamber 531.

A portion of liquid flowing inside tube 10 can enter the emitter 4000 via a liquid intake, which is an integral part of cover 400 and is situated along the cover 400. In some exemplary embodiments, the intake comprises a filter 410 configured to prevent clogging the emitter and or the aperture 20. It should be noted that the emitter 4000 as a whole, is fluidically or fluidly connecting tube 10 and aperture 20 while regulating a flow of the liquid to an environment outside the tube 10.

In some exemplary embodiments, the emitter 4000 can comprise an emitter body 500 having a convex surface along its longitude side and an opposite flat surface; a cover 400 configured to envelop all emitter body 500 sides except most of the convex side (surface); and a membrane 600 retained in-between the cover 400 and the body 500. In some exemplary embodiments, the edges of the cover 400 are terminated at the convex side of body 500 (with or without an undercut) are configured (shaped) to internally and adjacently fit the inner side of tube 10 so they can be secured, together with body 500 convex side to the tube 10. In other words, the structure of the emitter 4000 is designed to seal liquid passage to aperture 20 excluding the fluid connection via the intake.

Referring now to FIGS. 6A, 6B, 6C, 6D illustrating a flat side view, a longitudinal DD cross-section view, an EE cross-section view and an RR cross-section view of drip emitter 4000, in accordance with some exemplary embodiments of the disclosed subject matter.

In some exemplary embodiments, the emitter 4000 comprises a locking mechanism configured to connect cover 400 to emitter body 500. The locking mechanism preferably comprises four studs 502 that are all protrude of the flat side (surface) of emitter body 500 and four sockets 402 that are an integral part of cover 100. In some exemplary embodiments, sockets 402 correspond to studs 502 and configured to be interlocked together, i.e., snapped together, upon applied pressure.

Figure 6A:
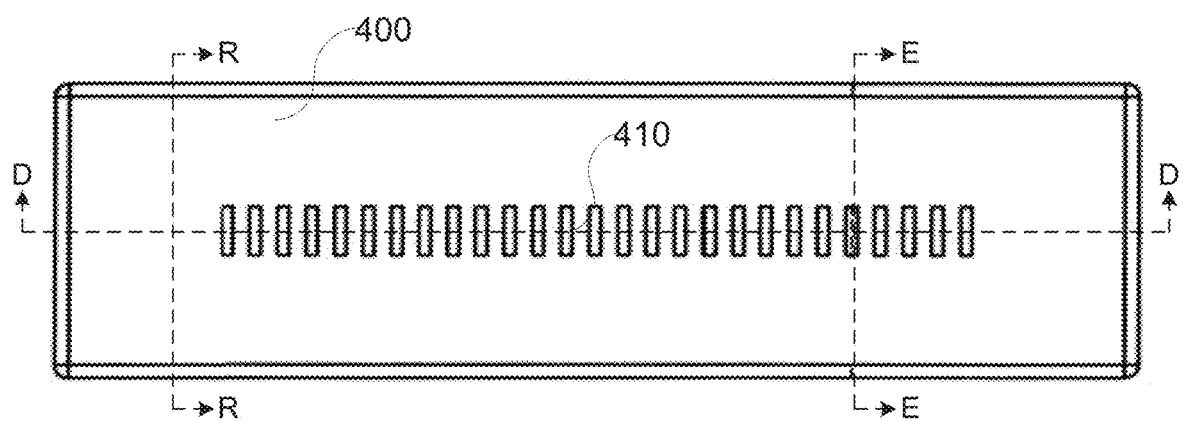
FIG. 6A illustrates an upper view of the drip emitter of FIG. 5A, in accordance with some exemplary embodiments of the disclosed subject matter.
Figure 6B:
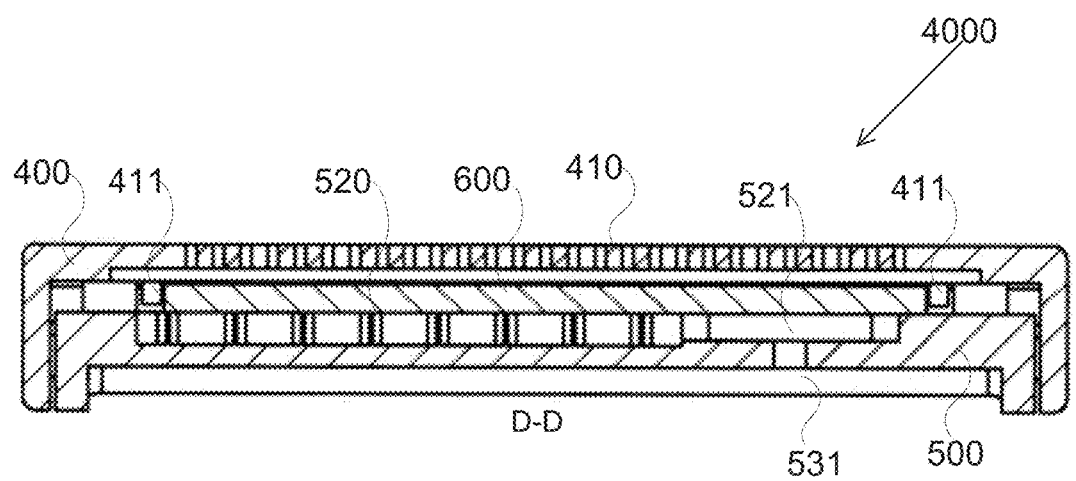
FIG. 6B illustrates a longitudinal cross-section view of the drip emitter of FIG. 5A, in accordance with some exemplary embodiments of the disclosed subject matter.
Figure 6C:
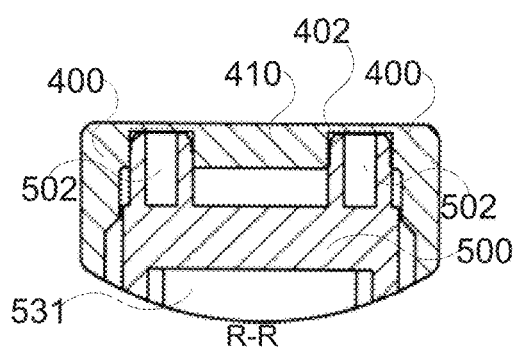
FIG. 6C illustrates a cross-section view of the drip emitter of FIG. 5A, in accordance with some exemplary embodiments of the disclosed subject matter.
Figure 6D:
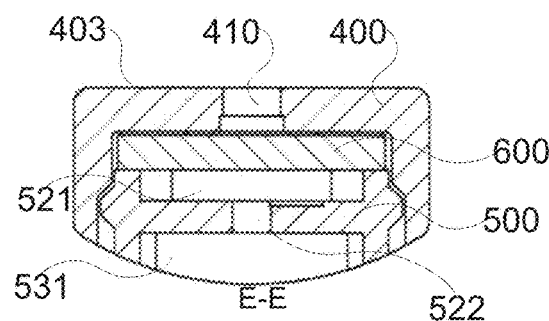
FIG. 6D illustrates another cross-section view of the drip emitter of FIG. 5A, in accordance with some exemplary embodiments of the disclosed subject matter.

It should be reminded that, membrane 600 is confined between cover 400 and body 500, as showed in FIGS. 6B and 6D. In some exemplary embodiments, membrane 600 substantially cover labyrinth 520 and regulating pool 521. To ensure that membrane 600 longitude positioning with respect to the labyrinth and the regulating cavity, retainers 411, which are an integral part of cover 400, are provided.

In some exemplary embodiments, liquid entering emitter 4000 can flow after passing filter 410 into regulator 520 for initial pressure drop prior to the flow regulation process.

Figure 7A:
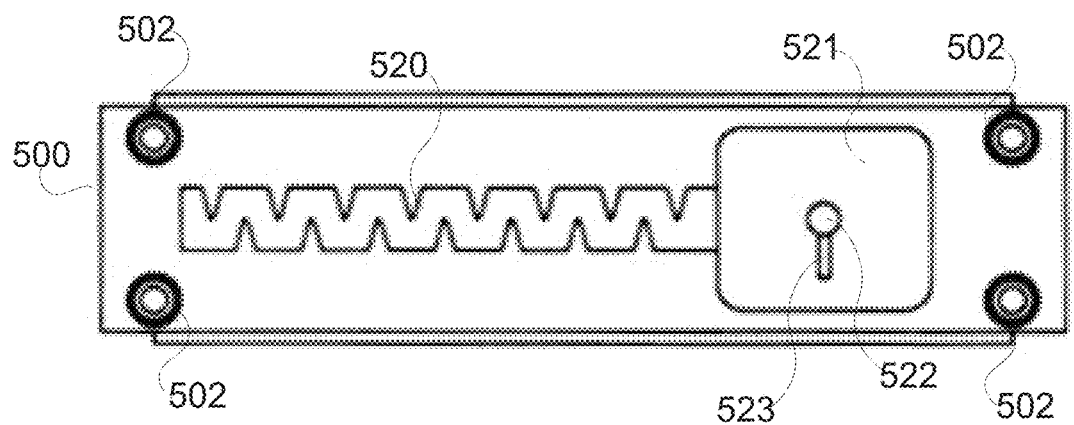
FIG. 7A illustrates a flat side view of a body of the drip emitter of FIG. 5A, in accordance with some exemplary embodiments of the disclosed subject matter.
Figure 7B:
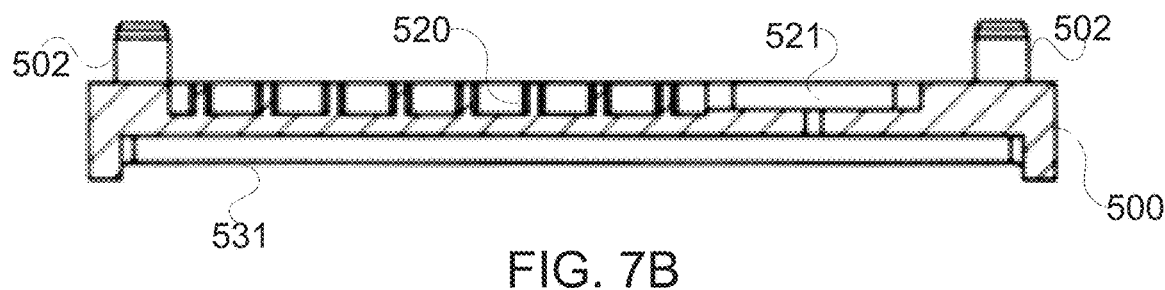
FIG. 7B illustrates a longitudinal cross-section view of the body of the drip emitter of FIG. 5A, in accordance with some exemplary embodiments of the disclosed subject matter.
Figure 7C:
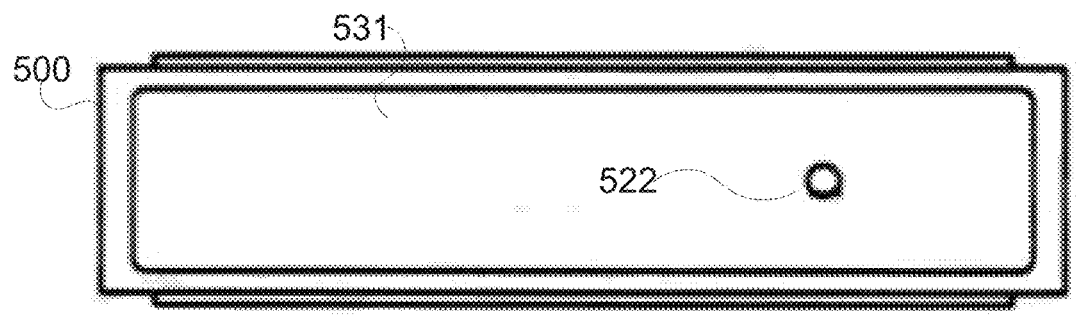
FIG. 7C illustrates a convex side view of the body of the drip emitter of FIG. 5A, in accordance with some exemplary embodiments of the disclosed subject matter.

Referring now to FIGS. 7A, 7B, and 7C illustrating a flat side view; a longitudinal cross-section view; and a convex side view of emitter body 500 of the drip emitter 4000, in accordance with some exemplary embodiments of the disclosed subject matter. Further to the above, liquid entering a labyrinth 520 exits into regulating pool 521 and from there proceed to outlet chamber 531 on the other side of the body. The regulating pool 521 is provided with a hole 522 and slot 523 that are fluidly connecting the labyrinth 520 and the dripping aperture 20 (not shown in FIGS. 7A, 7B, and 7C). The liquid is regulated by slot 523.

In some exemplary embodiments, the labyrinth 520 and regulating pool 521 are substantially covered by membrane 600 (not-shown in these figures). It should be understood that one side of the membrane 600 is subject to pressure applied from the intake side, whereas the opposite side of the membrane 600 is subject to pressure that is building up in the outlet chamber 531 (outlet side), practically dictated by aperture 20 size (resistance).

Figure 8A:
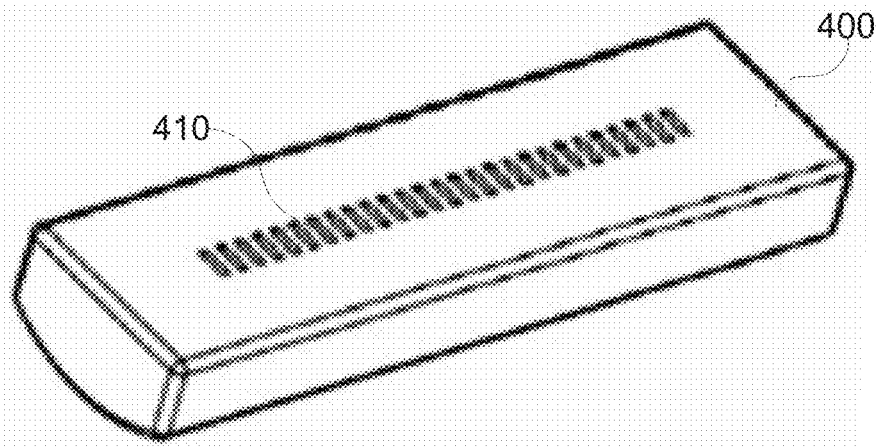
FIG. 8A illustrates an isometric view of an outer side of a cover of the drip emitter of FIG. 5A, in accordance with some exemplary embodiments of the disclosed subject matter.
Figure 8B:
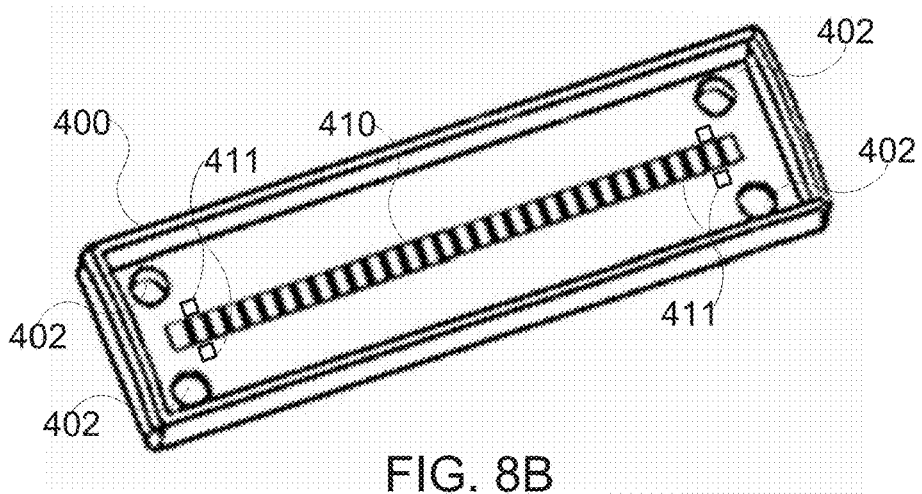
FIG. 8B illustrates an isometric view of an inner side of the cover of the drip emitter of FIG. 5A, in accordance with some exemplary embodiments of the disclosed subject matter.
Figure 8C:
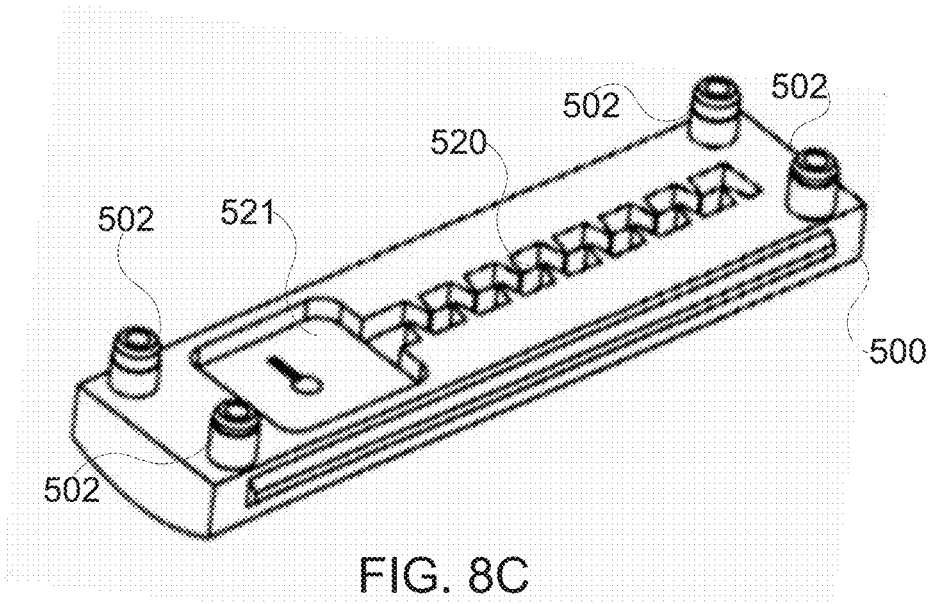
FIG. 8C illustrates an isometric view of the body of the drip emitter of FIG. 5A, in accordance with some exemplary embodiments of the disclosed subject matter.
Figure 9A:
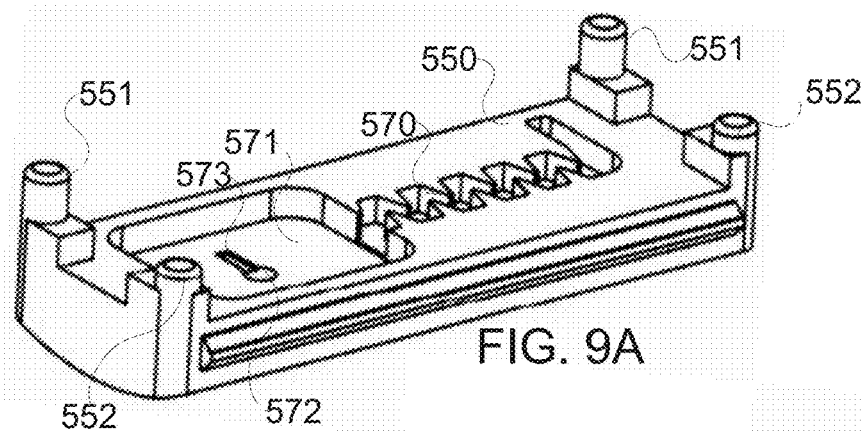
FIG. 9A illustrates an isometric view of a body of yet another drip emitter, in accordance with some exemplary embodiments of the disclosed subject matter.
Figure 9B:
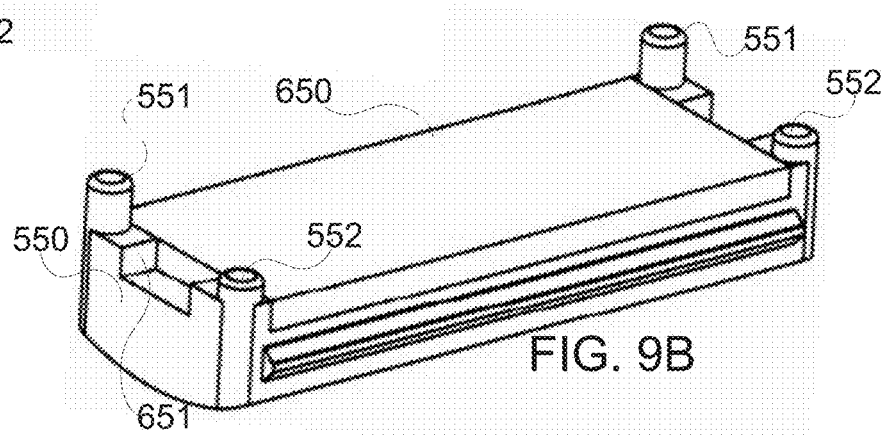
FIG. 9B illustrates an isometric view of the body, of the drip emitter of FIG. 9A, with a membrane positioned on it, in accordance with some exemplary embodiments of the disclosed subject matter.
Figure 9C:
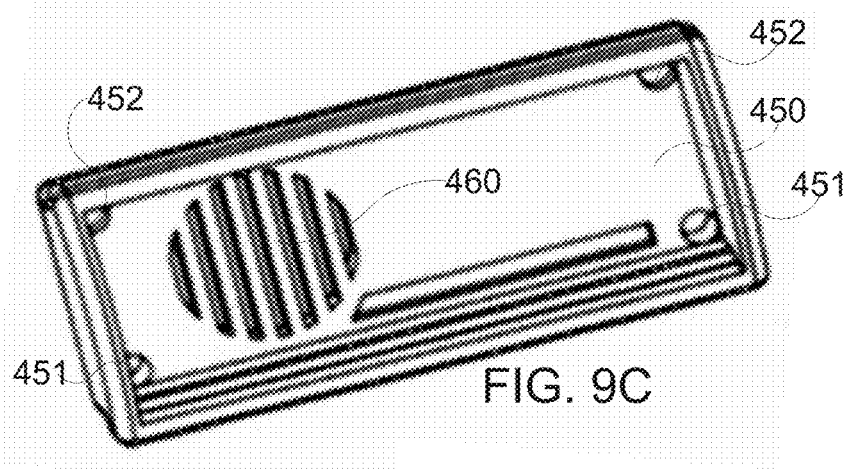
FIG. 9C illustrates an isometric view of an inner side of a cover of the drip emitter of FIG. 9A, in accordance with some exemplary embodiments of the disclosed subject matter.
Figure 9D:
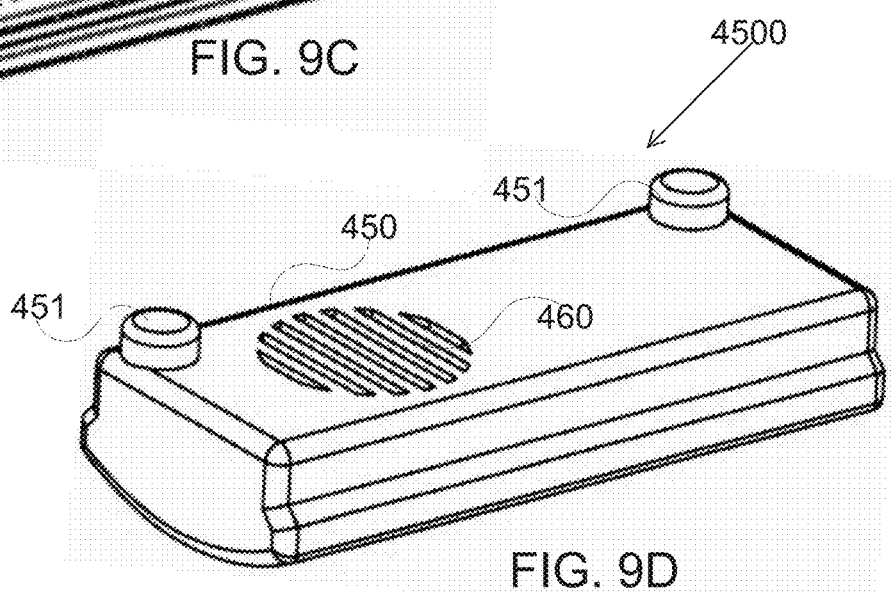
FIG. 9D illustrates an isometric view of an outer side of the cover of the drip emitter of FIG. 9A, in accordance with some exemplary embodiments of the disclosed subject matter.

Referring now to FIGS. 8A, 8B, and 8C illustrating an isometric view of body 500; an isometric view of inner and outer sides of a cover 400 of the drip emitter 4000, in accordance with some exemplary embodiments of the disclosed subject matter. Both body 500 and cover 400 together with membrane 600 (not shown in these figures) constitutes the main components for assembling the drip emitter 4000. FIGS. 8B and 8C clearly illustrates the correspondence between the studs 502 and the sockets 402.

Referring now to FIGS. 9A, 9B, 9C, and 9D, illustrating an isometric view of a body 550; an isometric view of the body 550; an isometric view of an inner side of a cover 450; and an isometric view of an outer side of the cover 450 of a drip emitter 4500, in accordance with some exemplary embodiments of the disclosed subject matter.

Drip emitter 4500 comprises features and functionalities that are and/or attributed to drip emitter 4000 as depicted in FIGS. 6A, 6B, 6C, 6D, 7A, 7B, 7C 8A, 8B, and 8C and the description above.

In some exemplary embodiments, the emitter 4500 comprises an emitter body 550 having a convex surface along its longitude side and an opposite flat surface; a cover 450 configured to envelop all emitter body 550 sides except most of the convex side (surface); and a membrane 650 retained in-between the cover 450 and the body 550. In some exemplary embodiments, edges of the cover 450 that are terminated at the convex side of body 550 are configured (shaped) to internally and adjacently fit the inner side of tube 10 (not shown) so they can be secured, together with body 550 convex side to the tube 10 (not shown). In other words, the structure of the emitter 4500 is designed to seal liquid passage to aperture 20 (not shown) excluding the fluid connection via the intake.

In some exemplary embodiments, the emitter 4500 comprises a locking mechanism configured to connect cover 450 to emitter body 550. The locking mechanism comprises two long studs 551 and two studs 552 that are all protrude of the flat side (surface) of emitter body 550. Additionally, the locking mechanism comprise two protruding (long) sockets 451 and two sockets 452 that are part of cover 400. In some exemplary embodiments, the protruding sockets 451, protrude of the outer side of the cover, and sockets 452 correspond to long studs 551 and studs 552, respectively, and configured to be interlocked together, i.e. snapped together upon applied pressure. It should be noted that the two protruding sockets 451 positioned along a side of cover, can serve as indicator pointing out the location outlet chamber, as depicted previously in the description of drip emitter 2000.

It should be reminded that, membrane 650 is confined between cover 450 and body 550. In some exemplary embodiments, membrane 650 completely covers labyrinth 570 and regulating pool 571. In some exemplary embodiments, liquid entering emitter 4500 can flow after passing filter 460 into labyrinth 570 for initial pressure drop prior to flow to the regulation process—the regulating pool 571 that comprises a hole 572 and a slot 573, as explained herein before.

It is noted that the membrane 650 is covering almost all of the flat surface of the emitter body and is retained by retainers 651 that act as a base for the four studs (551 and 552).

Figure 10A:
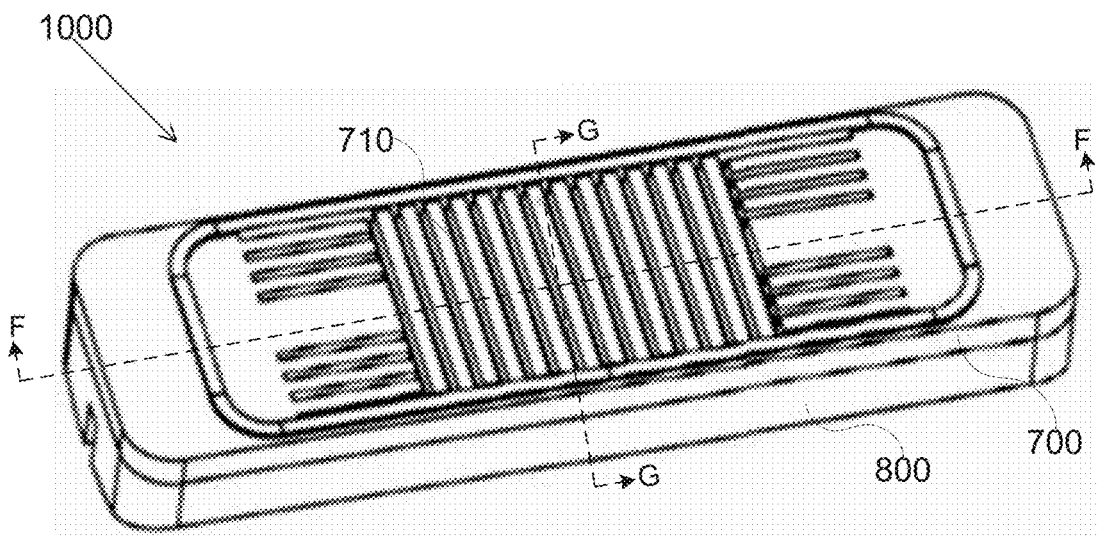
FIG. 10A illustrates an isometric view of yet another drip emitter, in accordance with some exemplary embodiments of the disclosed subject matter.
Figure 10B:
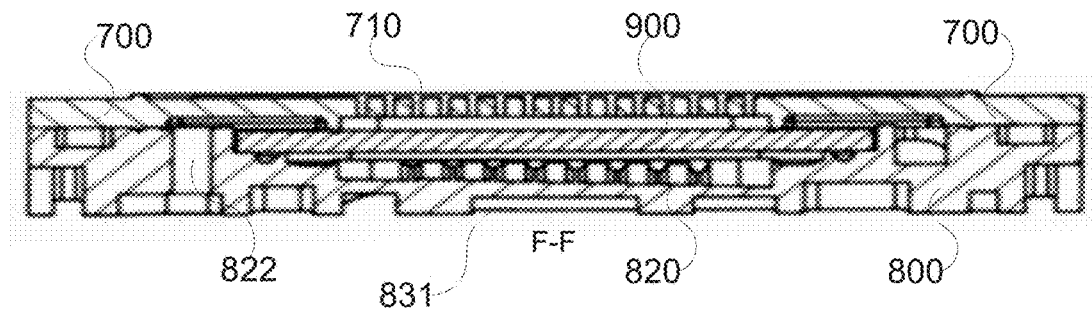
FIG. 10B illustrates a longitudinal cross-section view of the drip emitter of FIG. 10A, in accordance with some exemplary embodiments of the disclosed subject matter.
Figure 10C:
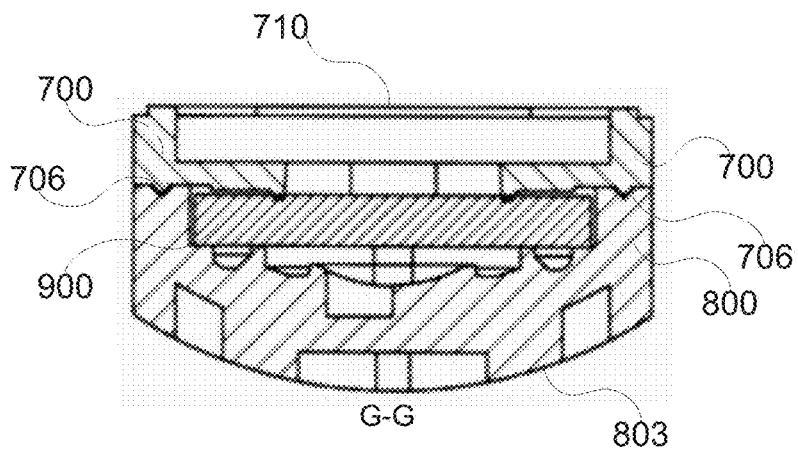
FIG. 10C illustrates a cross-section view of the drip emitter of FIG. 10A, in accordance with some exemplary embodiments of the disclosed subject matter.
Figure 11A:
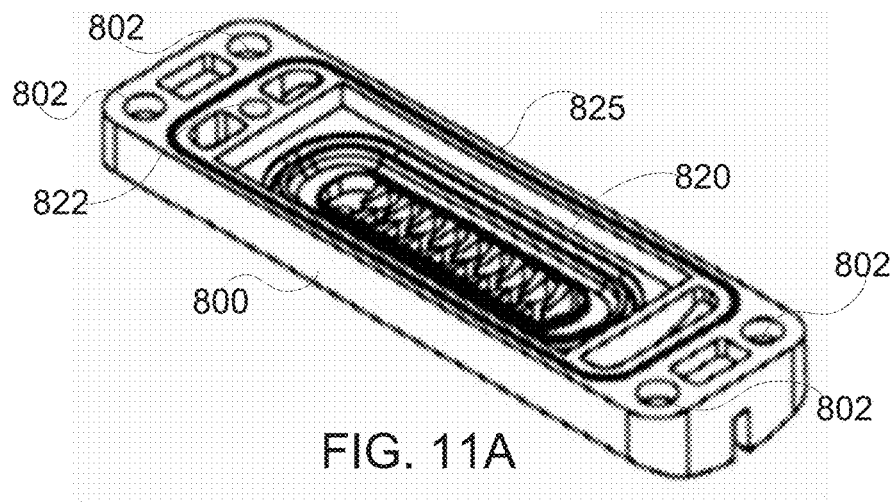
FIG. 11A illustrates an isometric view of a body of the drip emitter of FIG. 10A, in accordance with some exemplary embodiments of the disclosed subject matter.
Figure 11B:
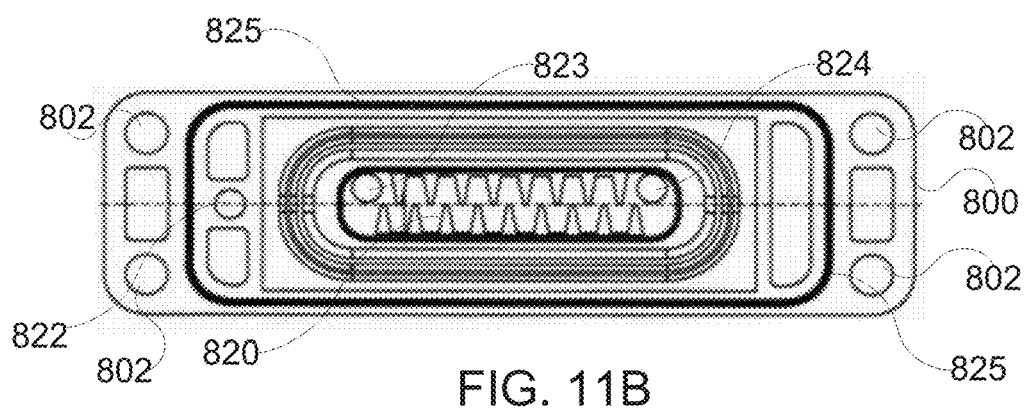
FIG. 11B illustrates a flat side view of the body of the drip emitter of FIG. 10A, in accordance with some exemplary embodiments of the disclosed subject matter.
Figure 11C:
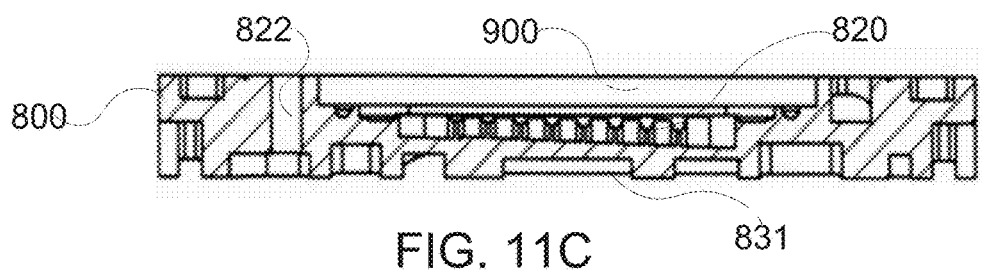
FIG. 11C illustrates a longitudinal cross-section view of the body of the drip emitter of FIG. 10A, in accordance with some exemplary embodiments of the disclosed subject matter.
Figure 11D:
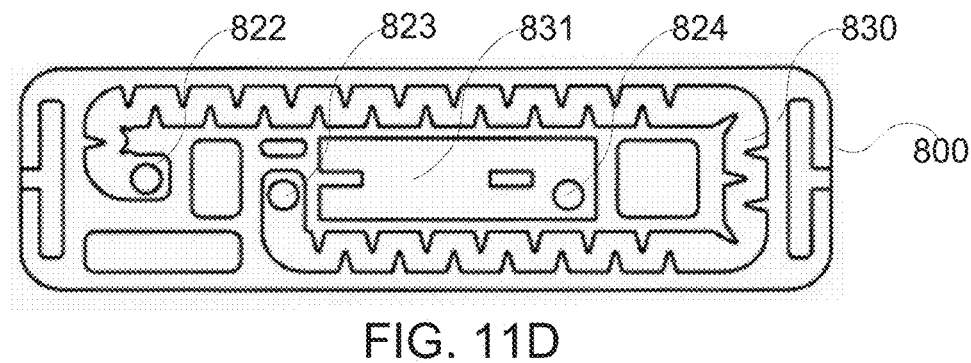
FIG. 11D illustrates a convex side view of the body of the drip emitter of FIG. 10A, in accordance with some exemplary embodiments of the disclosed subject matter.
Figure 12A:
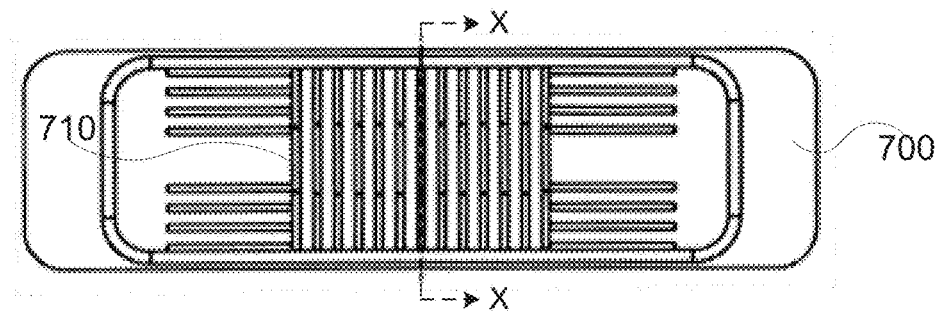
FIG. 12A illustrates an outer side view of a cover of the drip emitter of FIG. 10A, in accordance with some exemplary embodiments of the disclosed subject matter.
Figure 12B:
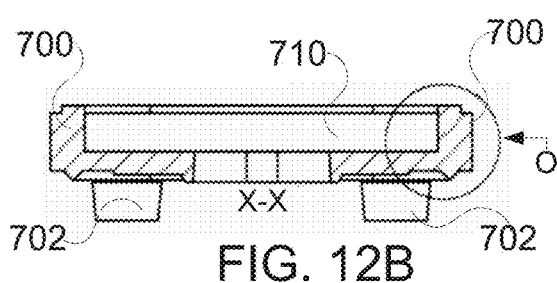
FIG. 12B illustrates a cross-section view of the cover of the drip emitter of FIG. 10A, in accordance with some exemplary embodiments of the disclosed subject matter.
Figure 12C:
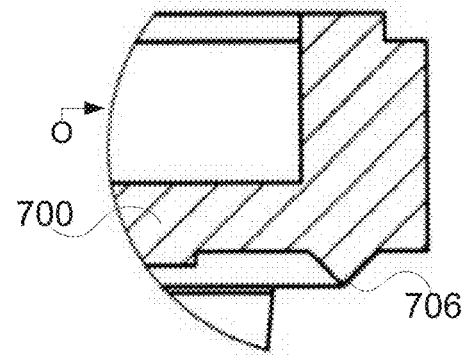
FIG. 12C illustrates an inner side view of the cover of the drip emitter of FIG. 10A, in accordance with some exemplary embodiments of the disclosed subject matter.
Figure 12C:
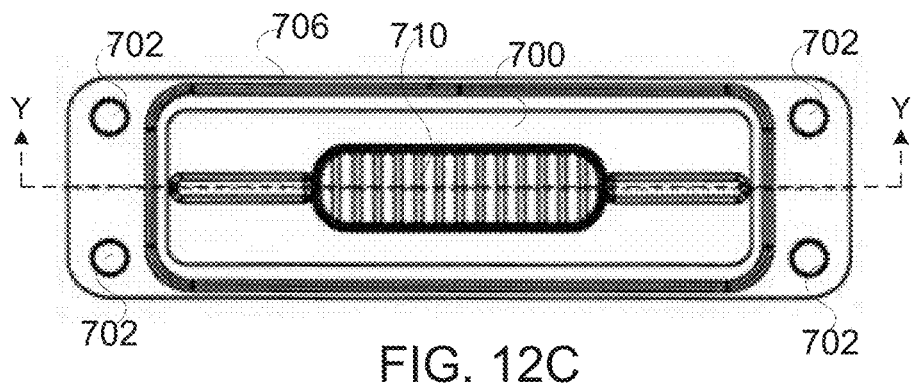
Figure 12D:
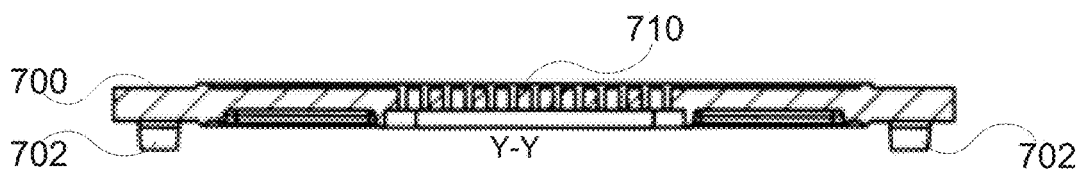
FIG. 12D illustrates a longitudinal cross-section view of the cover of the drip emitter of FIG. 10A, in accordance with some exemplary embodiments of the disclosed subject matter.

Referring now to FIGS. 10A, 10B, and 10C illustrating an isometric view; a longitudinal FF cross-section view; and an GG cross-section view of drip emitter 1000, in accordance with some exemplary embodiments of the disclosed subject matter.

In some exemplary embodiments, the emitter 1000 comprises an emitter body 800 having a convex surface 803 along its longitude side and an opposite flat surface; a cover 700, having an inner side and opposite outer side, configured to cover the flat side of emitter body 800; and a membrane 900 retained in-between the cover 700 and the body 800. In some exemplary embodiments, cover 700 is designed to seal liquid from passing into the emitter excluding an intake opening. The intake can be an integral part of the cover and may be coupled with filter 710, both are positioned together substantially along a center of the cover.

Referring now to FIGS. 11A, 11B, 11C, and 11D, illustrating an isometric view of body 800; a flat side view of the body 800; a longitudinal cross-section view of the body 800; and a convex side view of the body 800 of drip emitter 1000, in accordance with some exemplary embodiments of the disclosed subject matter.

It should be noted that, drip emitter 1000 can comprise features and functionalities that are similar and/or attributed to drip emitter 2000 as depicted in FIGS. 3A, 3B, 3C, and 5D and the description above. However, in some exemplary embodiments, drip emitter 1000 can comprise, in addition to the features of emitter 2000, a different cover such as cover 700 and a different connection between the body and the cover.

It should be reminded that, membrane 900 is confined between cover 700 and body 800, as showed in FIG. 10B. In some exemplary embodiments, membrane 900 substantially covers regulator 820. In some exemplary embodiments, liquid entering emitter 1000 can flow after passing filter 710 via first passage 822 into a primary labyrinth 830 configured for initial pressure drop prior to entering the flow regulation process.

Liquid entering primary labyrinth 830 from first passage 822 exits the primary labyrinth via second passage 823 into regulator 820 and from there proceed to outlet chamber 831, via third passage 824, which is fluidically or fluidly connected to the dripping aperture (not shown in this figure).

In some exemplary embodiments, regulator 820 positioned on the other side of the body is constituted of a regulating labyrinth covered by membrane 900. It should be understood that one side of membrane 900 is subject to pressure applied from the intake side, whereas the opposite side of the membrane 900 is subject to pressure that is building up in the outlet chamber 831 (outlet side), practically dictated by the aperture size (resistance).

Referring now also to FIGS. 12A, 12B, 12B1, 12C, and 12D, illustrating an outer side view; an XX cross-section view; an enlargement portion of the XX cross-section; an inner side view; and a longitudinal YY cross-section view of cover 700 of the drip emitter 1000, in accordance with some exemplary embodiments of the disclosed subject matter.

In some exemplary embodiments, the emitter 1000 comprises a locking mechanism configured to connect cover 700 to emitter body 800. At the flat side of emitter body 800 (FIG. 11B), four sockets 802, which are positioned at four corners of the body are provided. At the inner side of cover 700, four protruding studs 702 are provided. The studs correspond to the sockets and are used to facilitate positioning the two parts opposite to each other. At the inner side of cover 700, a projecting rim 706 is provided that surrounds the intake and filter 710 while preferably, but not mandatory, a groove 825 is provided at the flat side of the body that surrounds regulator 820.

In some exemplary embodiments, the projecting rim 706 is used for ultrasonic welding as the locking mechanism between the cover and the body. In case the groove 825 is provided opposite the projecting rim 706, the rim or parts of it at least during the welding process are positioned within the groove.

As explained herein before, the groove can be a redundant element and the projecting rim can be welded directly onto the body. It should also be mentioned that the projecting rim can be provided on the body 800 instead of the groove so as to weld the body onto the cover. The cover can alternatively be provided with a groove that correspond the projecting rim on the body. The projecting rim can be either on the cover or on the body.

It should be noted that, the exemplary embodiments of drip emitters 1000, 2000, 4000, 4500, and 1000 of the disclosed subject matter can be provided for installation within a liquid supply tube that have a plurality of dripping apertures. Each drip emitter may be used for a single aperture.

The disclosed drip emitters have a convex side adapted to internally and adjacently fit an inner side of the liquid supply tube, also if the diameters of tube is not exactly the same as the diameter of the convex side. The convex side of the emitters can be secured to the inner surface of the liquid supply tube by either welding, gluing, ultrasonic soldering, a combination thereof, or the like. The emitters of the present disclosure are to be secured to the tube in a position ensuring overlapping between the outlet chamber of the emitters and the aperture in tube.

All emitters of the present disclosure enable a portion of liquid flowing inside the tube to enter any one of the disclosed emitters through an intake coupled with a filter. The filters are configured to prevent clogging the emitter and or the aperture. It should be noted that each emitter is fluidically connecting the tube it is inserted in and an aperture it is adjacent to for regulating a flow of the liquid to the environment outside the tube Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A drip emitter sized for insertion into a liquid supply tube and positioned adjacent to a dripping aperture in the tube, the drip emitter comprising:
    an emitter body having a convex side configured to internally and adjacently fit the tube and an opposite flat side comprising a regulator, wherein the convex side comprises an outlet chamber configured to be fluidically connected to the dripping aperture;
    a membrane covering at least the regulator;
    a cover provided with a liquid intake having a filter, wherein the cover is configured to envelop the emitter body except for most of said convex side; and
    a first plurality of long studs and a second plurality of short studs configured on the flat side, and a first plurality of long sockets and a second plurality of short sockets configured on the cover, wherein each of the first plurality of long sockets is configured for receiving therein a corresponding one the first plurality of long studs, and each of the second plurality of short sockets is configured for receiving therein one of the second plurality of short studs, and wherein each of the plurality of long sockets at least partially protrudes from an outer surface of the cover and protrudes further from the outer surface than the plurality of short sockets;
    awherein the long studs, short studs, long sockets, and short sockets are configured to join said flat side and an inner surface of the cover that is adjacent to the flat side so as to join the cover to the emitter body wherein the membrane is retained therebetween.

2. The drip emitter of claim 1, wherein the emitter body further comprises a primary labyrinth on the convex side.

3. The drip emitter of claim 1, wherein the regulator is a regulating labyrinth.

4. The drip emitter of claim 1, wherein the regulator is a pool with regulating hole and slot.

5. A liquid supply tube having sequenced dripping apertures comprising a plurality of drip emitters of claim 1 welded to the tube, wherein each drip emitter is welded adjacent to one of the dripping apertures.

6. The drip emitter of claim 1, wherein the emitter body further comprises a primary labyrinth on the flat side.

7. The drip emitter of claim 1, wherein the plurality of long studs and plurality of short studs are arranged at four corners of the emitter body, and the plurality of long sockets and plurality of short sockets are arranged at four corners of the cover.

8. The drip emitter of claim 1, wherein the cover further comprises at least one retainer configured to longitudinally confine the membrane and thereby ensure that the membrane is properly positioned with respect to the regulator.

9. In a drip emitter sized for insertion into a liquid supply tube and positioned adjacent to a dripping aperture in the tube, the drip emitter comprising:
    an emitter body having a convex side comprising a primary labyrinth and an outlet chamber configured to be fluidically connected to the dripping aperture and an opposite flat side comprising a regulating labyrinth, wherein the convex side is configured to internally and adjacently fit the tube;
    a membrane covering at least the regulating labyrinth; and
    a cover provided with a liquid intake having a filter, wherein the cover is configured to envelop the emitter body except for most of said convex side wherein an edge of the cover internally and adjacently fits the tube;
    an improvement comprising:
    a first plurality of long studs and a second plurality of short studs configured on the flat side, and a first plurality of long sockets and a second plurality of short sockets configured on the cover, wherein each of the first plurality of long sockets is configured for receiving therein a corresponding one of the first plurality of long studs, and each of the second plurality of short sockets is configured for receiving therein one of the second plurality of short studs, and wherein each of the plurality of long sockets at least partially protrudes from an outer surface of the cover and protrudes further from the outer surface than the plurality of short sockets;
    awherein the long studs, short studs, long sockets, and short sockets are configured to join the flat side of the body to an inner surface of the cover that is adjacent to the flat side, wherein the membrane is retained therebetween;
    and
    wherein at least one of the plurality of long sockets comprises an indicator provided on the cover for indicating a position of the outlet chamber.

10. The drip emitter of claim 9, wherein at least one stud and at least one corresponding socket are interlocked through applied pressure.

11. A liquid supply tube having sequenced dripping apertures comprising a plurality of drip emitters of claim 9 welded to the tube, wherein each drip emitter is welded adjacent to one of the dripping apertures.

12. In a drip emitter sized for insertion into a liquid supply tube and positioned adjacent to a dripping aperture in the tube, the drip emitter comprising:
    an emitter body having a convex side comprising an outlet chamber configured to be fluidically connected to the dripping aperture and an opposite flat side comprising a labyrinth and a regulating pool having a hole and a slot, wherein the convex side is configured to internally and adjacently fit the tube;
    a membrane covering the regulating pool and at least a part of the labyrinth; and
    a cover having a liquid intake and a filter, wherein the cover is configured to envelop the emitter body except for said convex side wherein an edge of the cover internally and adjacently fits the tube;
    an improvement comprising:

a first plurality of long studs and a second plurality of short studs configured on the flat side, and a first plurality of long sockets and a second plurality of short sockets configured on the cover, wherein each of the first plurality of long sockets is configured for receiving therein a corresponding one of the first plurality of long studs, and each of the second plurality of short sockets is configured for receiving therein one of the second plurality of short studs, and wherein each of the plurality of long sockets at least partially protrudes from an outer surface of the cover and protrudes further from the outer surface than the plurality of short sockets;

wherein the plurality of long studs, short studs, long sockets, and short sockets are configured to join the flat side of the body to an inner surface of the cover that is adjacent to the flat side, wherein the membrane is retained therebetween.

13. The drip emitter of claim 12, wherein the hole is fluidically connected with the outlet chamber and the slot is perforated into the hole, wherein the regulating pool and the membrane are configured to regulate liquid pressure.

14. The drip emitter of claim 13, wherein the labyrinth is fluidically connected to the regulating pool.

15. A liquid supply tube having sequenced dripping apertures comprising a plurality of drip emitters of claim 12 welded to the tube, wherein each drip emitter is welded adjacent to one of the dripping apertures.

* * * * *